United States Patent [19]

Shiba et al.

[11] Patent Number: 4,515,322
[45] Date of Patent: May 7, 1985

[54] REEL FOR A MAGNETIC TAPE

[75] Inventors: Haruo Shiba; Yoshiya Sakata; Kimio Tanaka, all of Saku, Japan

[73] Assignee: TDK Corporation, Tokyo, Japan

[21] Appl. No.: 530,356

[22] Filed: Sep. 8, 1983

[30] Foreign Application Priority Data

Sep. 22, 1982 [JP] Japan ............................. 57-142583[U]

[51] Int. Cl.³ ............................................. B65H 75/18
[52] U.S. Cl. .................................. 242/71.8; 242/118.6
[58] Field of Search ... 242/118.4, 118.5, 118.6–118.62, 242/71.8, 71.9, 77.4; 29/453; 403/289, 290

[56] References Cited

U.S. PATENT DOCUMENTS 2,814,188 11/1957 Fox ...................................... 29/453 X
3,388,873 6/1968 Rosenbaum ....................... 242/55.21
3,989,885 11/1976 Penczynski ......................... 174/15 S Primary Examiner—Leonard D. Christian
Attorney, Agent, or Firm—Oblon, Fisher, Spivak, McClelland & Maier

[57] ABSTRACT

A reel for a magnetic tape comprises at least one boss for forcible insertion which is formed on a reel hub on the contacting to a flange; a fitting hole which is formed in the flange at a position corresponding to the boss and which has a smallest diameter portion smaller than the greatest diameter portion of the boss and a detent portion. The boss is provided with at least one dividing slot and an engaging jaw to engage with the detent portion of the fitting hole at a position where the boss is fully inserted.

7 Claims, 10 Drawing Figures

REEL FOR A MAGNETIC TAPE

The present invention relates to a reel for a magnetic tape.

Heretofore, connection of the hub of a reel to a flange used in a magnetic tape cartridge has been carried out mainly by means of caulking such as heat caulking, caulking with use of an ultrasonic horn and partly by a revolution-fitting method.

In the heat caulking method or the ultrasonic caulking method, it is necessary to use a jig for fixing the flange and the boss of the hub which are connected by fitting the boss into a hole of the flange and to apply to the top of the boss a heating jig or the ultrasonic horn so as to cause melt-bonding of the boss. However, these methods are disadvantageous in that the boss is excessively molten or is insufficiently molten due to error of application of and variation in temperature of the heating jig or the ultrasonic horn whereby complete melt-bonding of the flange is inhibited and a gap takes place between the flange and the hub. This has invited inferior products.

On the other hand, when the boss is fitted into the hole of the flange by causing their relative revolutions, there requires two steps: the flange is fixed with respect to the hub and then rotated. The revolution-fitting method hinders employment of automatic assembling operation and a large scale production system.

It is an object of the present invention to provide a reel for a magnetic tape which increases productivity in assembling operations and minimizes unevenness in quality of assembled products.

The foregoing and the other objects of the present invention have been attained by providing a reel for a magnetic tape comprising at least one boss for forcible insertion which is formed on a reel hub on the side contacting to a flange, a fitting hole which is formed in the flange at a position corresponding to the boss and which has a smallest diameter portion smaller than the greatest diameter portion of the boss and a detent portion, wherein the boss is provided with at least one dividing slot and an engaging jaw to engage with the detent portion of the fitting hole at a position where the boss is fully inserted.

According to a preferred embodiment of the present invention, the fitting hole of the flange has a tapered portion which becomes larger toward its inlet side while the top portion of the boss is tapered thereby serving as a guide at the time of the forcible insertion of the boss.

With the construction of the reel described above, assembling and fitting operations of the flange to the hub can be easily and precisely carried out. Namely, they are done by forcibly inserting the boss of the hub into the fitting hole of the flange without requiring any other operation. Further, melt-bonding operation to the boss is needless to thereby reduce occurrence of inferior products.

The foregoing object, other objects as well as specific construction, function and resulting effect of the reel for a magnetic tape according to the present invention will become more apparent and understandable from the following detailed description thereof, when read in conjunction with the accompanying drawing.

Preferred embodiments of the present invention will be described with reference to drawing.

Figure 1:
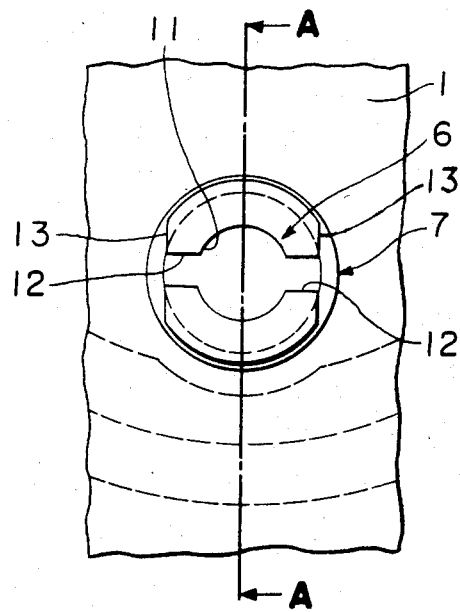
FIG. 1 is a plan view of an embodiment of the reel for a magnetic tape of the present invention.
Figure 2:
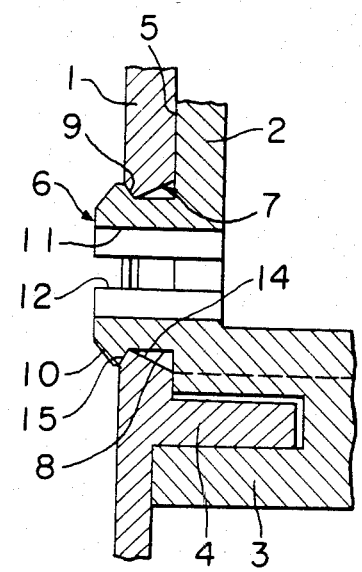
FIG. 2 is a cross sectional view taken along the line A—A in FIG. 1.

FIGS. 1 and 2 show an important portion of the plastic tape reel according to the first embodiment of the present invention. In FIGS. 1 and 2, the reference numeral 1 designates a flange and the numeral 2 designates a reel hub provided with a peripheral surface 3 on which a magnetic tape is wound (An integrally formed flange on the opposite side is omitted in the figures). The flange 1 is provided with an annular extrusion 4 which may be of a separable type and which is to be fitted into a recess of the hub 2 for the purpose of obtaining easy, stable assembling operations of the hub 2 to the flange 1. A boss 6 extends from a surface 5 of the hub 2 to which the flange 1 contacts. The flange 1 is provided with a fitting hole 7 passing therethrough and the boss 6 is fitted into the fitting hole 7 to be secured. At least one boss 6 and one fitting hole 7 are provided. In this case, they are located at a position corresponding to the center of the hole of the reel into which the driving shaft of a cassette recorder is fitted. When two or more bosses 6 and fitting holes 7 are respectively to be provided, they may be located on a circle having its center at the center of the reel hole in a symmetrical manner opposing radially with respect to the center. It is possible to use a combination of arrangements of the boss and the fitting hole.

The boss 6 is substantially cylindrical in shape and has a cylindrical base portion 8 having a diameter the same as or smaller than the diameter of the smallest diameter portion of the fitting hole 7 of the flange, an emgaging jaw 9 to be engaged with a detent portion 15 of the fitting hole 7 when the boss 6 is forcibly inserted into the fitting hole 7 and a tapered edge 10 to facilitate insertion of the boss into the fitting hole 7. The boss 6 is further provided with a central bore 11 and plural dividing slots 12 to impart the boss some deflective property and elasticity. As shown in FIG. 1, notched portions are formed in the outer peripheral portion of the boss to provide a pair of parallel side surfaces 13, 13. These notched portions are essential to insert the boss into the fitting hole.

The fitting hole 7 has an inlet portion greater than the diameter of the tapered edge of the boss and a tapered surface 14 having the smallest diameter portion which is the same as or slightly greater than the base portion 8 of the boss 6. The fitting hole further comprises a detent portion 15 for engaging with the engaging jaw 9 of the boss 6. Each of the engaging surfaces of the engaging jaw 9 and the detent portion 15 is preferably tapered so that a force for pulling the flange 1 toward the hub 2 is realized when both the members are engaged.

Figure 3:
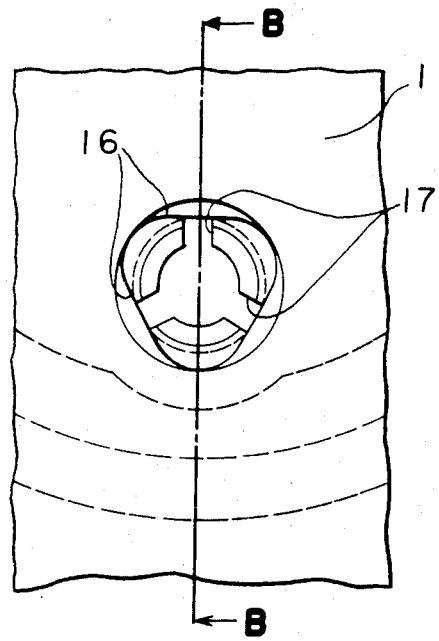
FIG. 3 is a plan view of another embodiment of the reel of the present invention.
Figure 4:
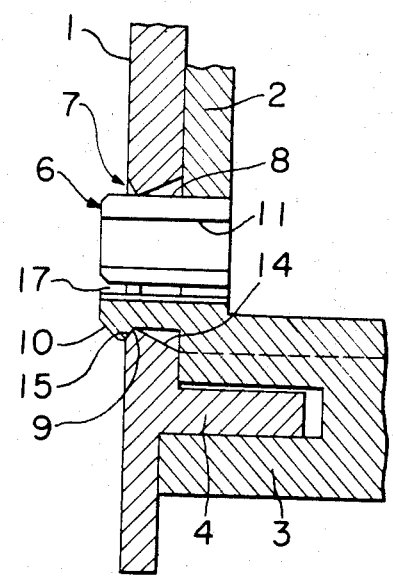
FIG. 4 is a cross sectional view taken along the line B—B in FIG. 3.

FIGS. 3 and 4 show another embodiment of the present invention. The construction of the reel is the same as that as shown in FIG. 1 and 2 except that the number of the dividing slot is different. The same reference numerals designate the same parts and only different part will be described. In this embodiment, the two side surfaces 13, 13 and two dividing slots 12, 12 formed in the boss as shown in FIGS. 1 and 2 are respectively replaced by three side surfaces 16, 16, 16 and three dividing slots 17, 17, 17. The construction of this embodiment provide further easiness of insertion of the boss 6 into the fitting hole because elasticity of the boss is increased.

Figure 5:
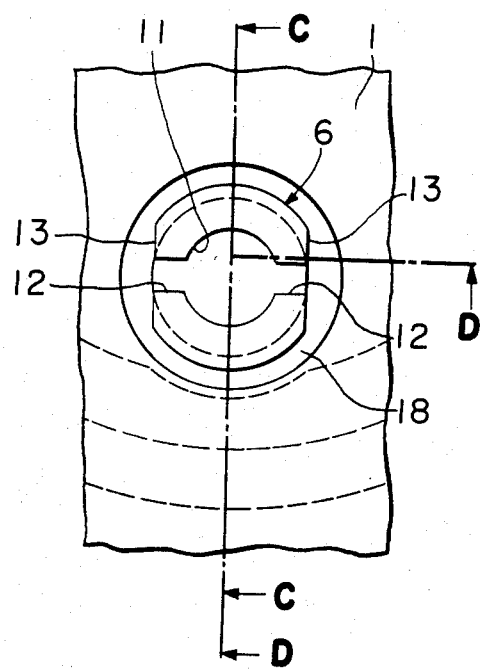
FIG. 5 is a plan view of still another embodiment of the reel of the present invention.
Figure 6:
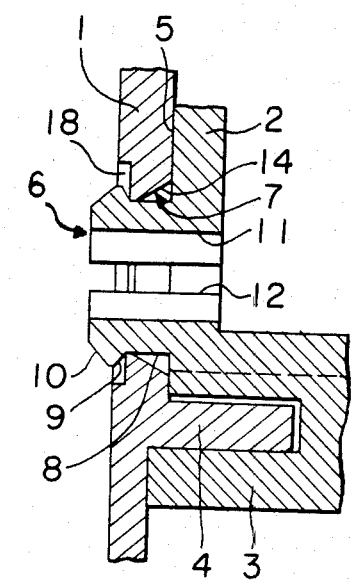
FIG. 6 is a cross sectional view taken along the line C—C in FIG. 5.
Figure 7:
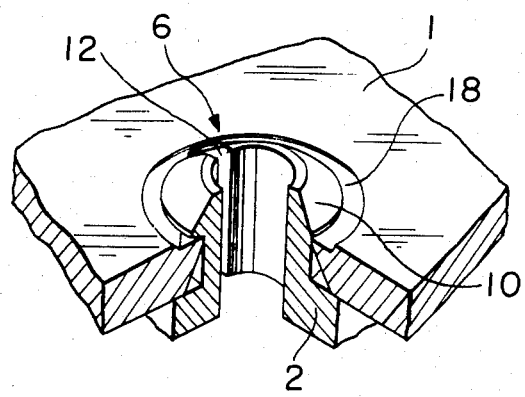
FIG. 7 is a schematic view partly broken of the reel shown in FIGS. 5 and 6.
Figure 8:
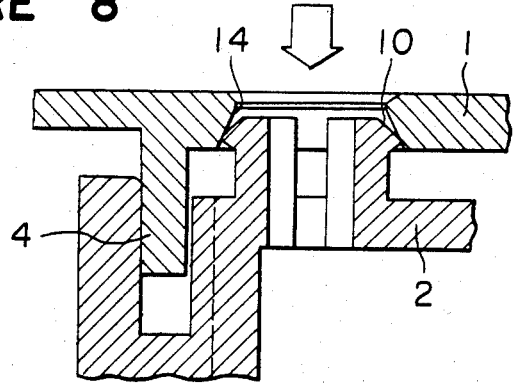
FIGS. 8 to 10 are sectional views which show sequentially steps of assembling operations of the reel for the magnetic tape.

FIGS. 5 and 6 show still another embodiment of the present invention. The construction of this embodiment is the same as that of FIGS. 1 and 2 except for the construction of the detent portion of the the flange. The same reference numerals designate the same parts in FIGS. 1 and 2 and the description of the parts on the same reference numerals is omitted. A spot facing is formed around the fitting hole 7 of the flange 1 to provide a detent portion 18. It is clearly understood that because the engaging jaw 9 of the boss 6 is tapered, the flange 1 is forced to toward the hub 2 when the boss is engaged with the reduced diameter portion of the detent portion 18.

Assembling operation of the reel constructed as in the FIGS. 1 and 2 will be described.

Figure 9:
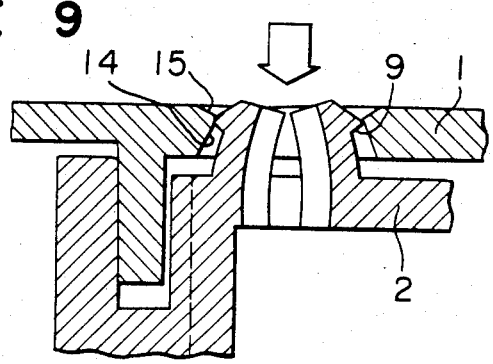
Figure 10:
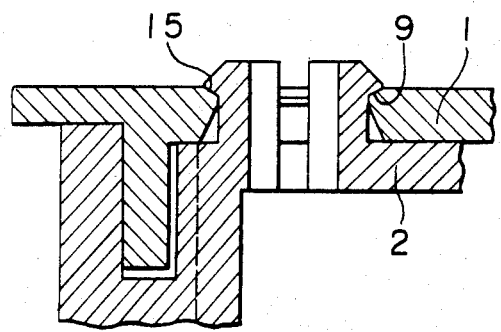

The annular extrusion 4 of the flange 1 is fitted into the recess of the hub 2 and at the same time, the boss 6 of the hub 2 is applied to the fitting hole 7 formed corresponding to it. At this moment, the tapered edge 10 of the boss is brought to engagement with the tapered surface 14 of the fitting hole. In this state, when the flange 1 is pushed in the arrow mark direction, the boss is inwardly deflected because of the tapered surface 14 of the fitting hole to pass through it as shown in FIG. 9. When the greatest diameter portion of the boss (the outer edge of the engaging jaw 9) has passed through the smallest diameter portion (the innermost portion of the tapered surface 14) of the fitting hole, the external force applied to the boss is released and the boss is firmly secured at a predetermined position (FIG. 10). By adequately determining the positional relationship of the engaging jaw 9 to the detent portion 15 as described before, a component of force biasing the assembly to return to its original state can be utilized to fasten the engaging jaw 9 to the detent portion 15. As described above, the construction of the reel of the present invention makes assembling operations of the flange and the hub easy and reduces the production of inferior goods, as well as realizing the many other advantages described above.

We claim:

1. A reel for magnetic tape, said reel comprising:
   (a) a flange having at least one fitting hole extending therethrough from a first side thereof to a second side thereof, said at least one fitting hole having a certain shape and certain dimensions at the first side of said flange, having a first tapered peripheral surface which tapers radially inwardly from the first side of said flange until the radial dimensions of said at least one fitting hole are less than they are at the first side of said flange and a second tapered surface which tapers radially outwardly until said at least one fitting hole reaches the second side of said flange, and
   (b) a reel hub having a peripheral surface on which a magnetic tape is wound during use of the reel, said reel hub having a planar surface which bears forcibly against the first side of said flange and a boss which extends into said at least one fitting hole, said boss having a first tapered peripheral surface which bears forcibly against the first tapered peripheral surface of said at least one fitting hole during assembly of said hub and said flange and a second tapered peripheral surface which bears forcibly against the second tapered surface of said at least one fitting hole once said reel hub and said flange have been assembled, said boss being sized and shaped to fit through said at least one fitting hole but having maximum radial dimensions between its first and second tapered surfaces which exceed the minimum radial dimensions of said at least one fitting hole between its first and second tapered surfaces, said boss having at least two at least generally radially oriented, axially extending dividing slots therein which divide said boss into segments and which permit the segments of said boss to flex radially inwardly as said boss is forced through said at least one fitting hole during assembly, the axial distance between the planar surface of said reel hub and the second tapered surface of said boss being such that the segments of said boss are flexed radially inwardly when said flange and said reel hub are in their assembled condition,
   whereby said flange and said reel hub are firmly held together in their assembled condition by engagement of the second tapered surface on said boss with the second tapered surface in said at least one fitting hole and by engagement of the first side of said flange and the planar surface of said reel hub.

2. A reel for magnetic tape as recited in claim 1 wherein the tapered surfaces on said boss and in said at least one fitting hole are all conical in shape.

3. A reel for magnetic tape as recited in claim 2 wherein said at least one fitting hole has a cylindrical portion between its first and second tapered surfaces.

4. A reel for magnetic tape as recited in claim 1 wherein there is an axial bore through said boss.

5. A reel for magnetic tape as recited in claim 1 and further comprising at least one projection carried by said flange which is received in a correspondingly sized and shaped recess in said reel hub.

6. A reel for magnetic tape as recited in claim 5 wherein said at least one projection is an annular flange which surrounds and is concentric with said at least one fitting hole.

7. A reel for magnetic tape as recited in claim 1 wherein said boss is sized so that, when said reel hub and said flange have been assembled, said boss projects beyond the second side of said flange.

* * * * *